United States Patent [19]

Voshell et al.

[11] Patent Number: 5,742,526

[45] Date of Patent: Apr. 21, 1998

[54] APPARATUS AND METHOD FOR IDENTIFYING AN INTEGRATED DEVICE

[75] Inventors: Thomas W. Voshell, Boise; Lisa J. Davis, Meridian, both of Id.

[73] Assignee: Micron Technology, Inc., Boise, Id.

[21] Appl. No.: 582,581

[22] Filed: Jan. 3, 1996

[51] Int. Cl.⁶ .................................................. G05B 19/00

[52] U.S. Cl. .................. 364/579; 364/708.1; 364/709.09; 364/468.22; 235/441; 235/380

[58] Field of Search ....................... 364/579, 550, 364/481, 708.1, 709.09, 1.01, 468.22, 23.28; 324/73.1, 158.1, 764, 765; 365/96, 201, 225.7, 174; 340/572, 568, 825.34, 54; 235/441, 380, 487, 438, 375, 376; 902/26, 39; 206/710–712, 706; 437/8; 439/55, 62; 209/571–573, 552

[56] References Cited

U.S. PATENT DOCUMENTS

| | | | |
|---|---|---|---|
| 4,523,297 | 6/1985 | Ugon et al. | 364/709.1 |
| 5,079,725 | 1/1992 | Geer et al. | 364/550 |
| 5,289,113 | 2/1994 | Meaney et al. | 324/73.1 |
| 5,301,143 | 4/1994 | Ohri et al. | 365/96 |
| 5,345,110 | 9/1994 | Renfro et al. | 307/272.3 |
| 5,465,850 | 11/1995 | Kase | 324/764 |
| 5,467,304 | 11/1995 | Uchida et al. | 365/174 |

Primary Examiner—Emanuel T. Voeltz
Assistant Examiner—Hal D. Wachsman
Attorney, Agent, or Firm—Seed and Berry LLP

[57] ABSTRACT

An apparatus identifies an integrated circuit. The apparatus includes a portable housing that has mounted thereto a processing circuit for reading identification data stored in the integrated circuit. A communication device is mounted to the housing and couples the identification data from the integrated circuit to the processing circuit. A display device that is mounted to the housing and is coupled to the processing circuit displays the identification data.

13 Claims, 6 Drawing Sheets

5,742,526

APPARATUS AND METHOD FOR IDENTIFYING AN INTEGRATED DEVICE

TECHNICAL FIELD

The invention relates generally to electronic devices and more specifically to a portable device for reading identification information from an integrated circuit (IC).

BACKGROUND OF THE INVENTION

Many semiconductor devices, i.e., ICs or "chips," have identification data or information stored therein. For example, an IC may have stored therein the revision number of the mask set used to form it. Typically, this information is electronically stored in the IC before it is delivered to the customer, or is written on an exposed surface of the IC die before it is packaged. For example, one may blow in a predetermined pattern a set of fuses formed on the IC to encode such information electronically, or one may use a laser to write such information on an exposed surface of the unpackaged IC. Circuits suitable for use with the fuse-encoding technique are discussed in U.S. Pat. Nos. 5,345,110, entitled "Low Power Fuse Detect and Latch Circuit," which issued to Renfro et al. on Sep. 6, 1994, and 5,301,143, entitled "Method for Identifying a Semiconductor Die Using an IC with Programmable Links," which issued to Ohri et al., on Apr. 5, 1994. Both of these patents are incorporated by reference herein.

If the identification information is electronically stored in the IC, one typically uses a semiconductor testing apparatus to read this information. If the identification information is written on the die, one often must irreparably dismantle the IC package in order to access this information.

A problem associated with using a semiconductor testing apparatus to read identification information from an IC is that one often has limited or no access to such a tester. Because such a tester is often expensive and immobile once installed, it is typically located only at a semiconductor fabrication or test site. Furthermore, because such a tester often requires complex and lengthy reprogramming to perform a task other than the currently programmed task, reprogramming the tester merely to read identification data from an IC is often inefficient. Additionally, because such a tester is often difficult to use, it typically requires a trained technician to operate it.

SUMMARY OF THE INVENTION

In accordance with one aspect of the present invention, an apparatus is provided for identifying an integrated circuit. The apparatus includes a portable housing having mounted thereto a processing circuit for reading identification data stored in the integrated circuit. A communication device is mounted to the housing and couples the identification data from the integrated circuit to the processing circuit. A display device that is mounted to the housing and is coupled to the processing circuit displays the identification data.

An advantage provided by the present invention is a portable, inexpensive, and easy-to-use device for reading identification data from an IC.

DETAILED DESCRIPTION OF THE INVENTION

Figure 1:
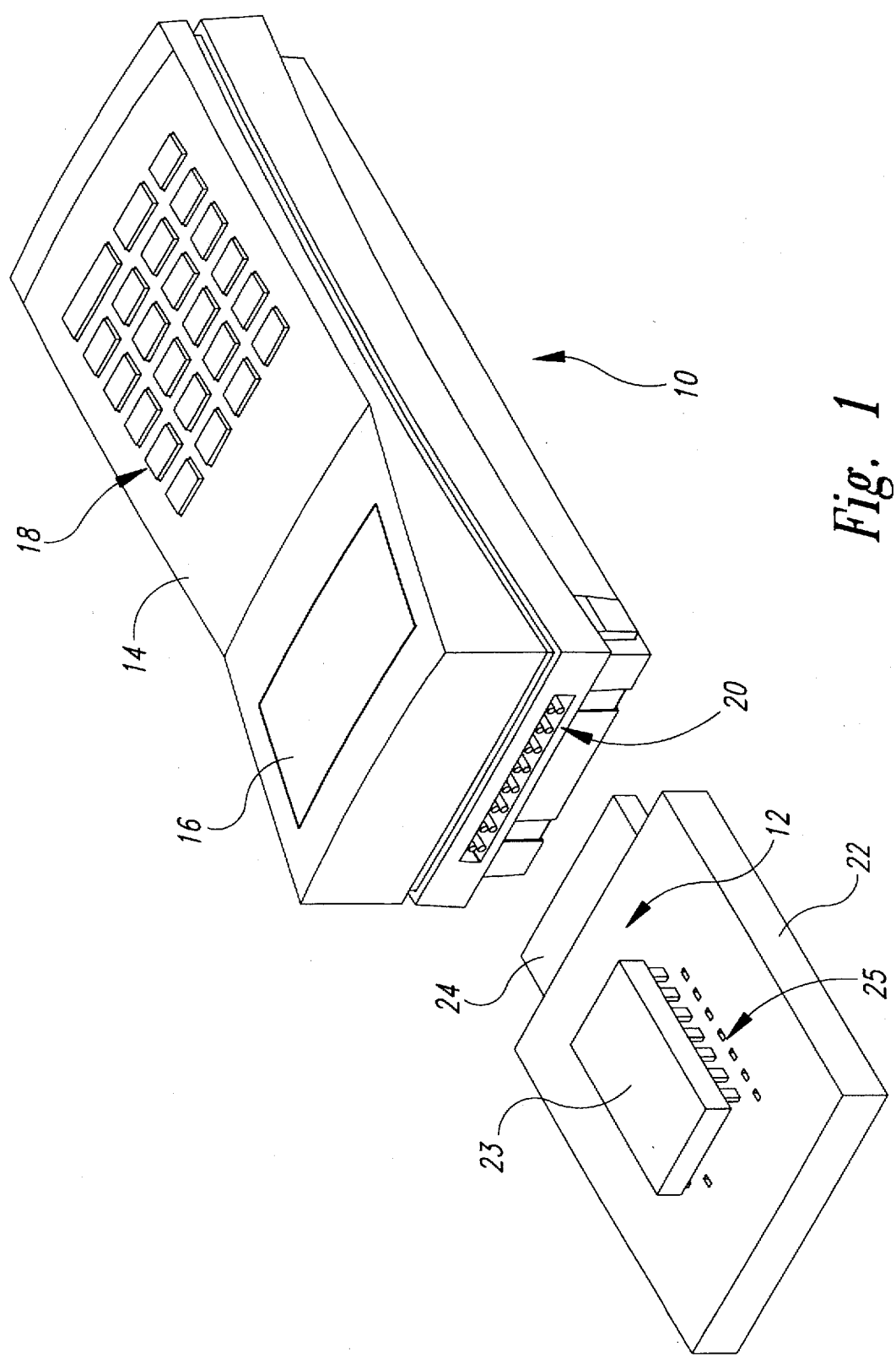
FIG. 1 is an isometric view of a device according to the present invention for reading identification data from an IC.

FIG. 1 is an isometric view of a preferred embodiment of a device 10 for reading identification data that is electronically stored in an IC 12. The device 10 includes a portable enclosure or housing 14, which has a number of sides or walls as shown. In one embodiment of the invention, the size of the housing 14 allows an operator (not shown) to hold the device 10 in his hand. Furthermore, the housing 14 may be made out of any suitable material such as plastic or metal. The device 10 also includes a conventional display 16 that is mounted or otherwise attached to the housing 14 and is exposed through an opening in an upper wall of the housing 14 as shown. In one embodiment of the invention, the display 16 is a Liquid Crystal Display (LCD), although the display 16 may be another type of device such as a Light Emitting Diode (LED) display or a printer. A conventional input device 18 is mounted to the housing 14 and is accessible via another opening or set of openings in the upper wall of the housing 14. In one embodiment of the invention, the input device 18 is a keypad such as that found in a pocket calculator. A conventional communication device, such as a connector 20, is mounted to the housing 14 and extends through an opening in a rear lateral wall thereof.

The device 10 may also include one or more optional adapters 22, which provide an interface between the connector 20 and a package 23 of the IC 12. For example purposes, the IC 12 is shown as having a 14-pin dual in-line package (DIP) 23. The adapter 22 includes a conventional connector 24 that is suitable for mating with the connector 20, and a conventional connector 25, which, for example purposes, is shown as a 14-pin DIP connector that is suitable for mating with the package 23. In one embodiment of the invention, the connector 20 is a conventional male-type connector, and the connector 24 is a conventional female-type connector.

In operation, the IC 12 is coupled to the connector 20 either directly or via the adapter 22. After the device 10 is powered up, typically by the operator switching an on/off switch (not shown in FIG. 1) to the "on" position, processing circuitry mounted within the housing 14 extracts or reads the identification information that has been electronically stored in the IC 12. Such information may include the version of the mask set used to manufacture the IC 12, the date of manufacture, the position of the die (not shown) of IC 12 on the wafer (not shown), the site of manufacture, or the type of component that IC 12 is. After the device 10 reads the identification information, it displays the portion or portions of this information that the operator has selected via the input device 18. In one embodiment of the invention, the display 16 displays a menu of prompts that show the operator the portions of information that he can view and explain how he can select the portions he wishes to view. In another embodiment of the invention, the device 10 reads and stores all of the identification information before it gives the operator access to this information. Such reading before giving the operator access allows the operator to uncouple the IC 12 from the device 10 before or while he or she views the identification information on the display 16.

Thus, the device 10 provides a portable, inexpensive and easy-to-use way to read identification data from an IC. The device 10 is useful in a number of situations, from identifying an unmarked IC during trouble shooting of a device to identifying stolen ICs.

Figure 2:
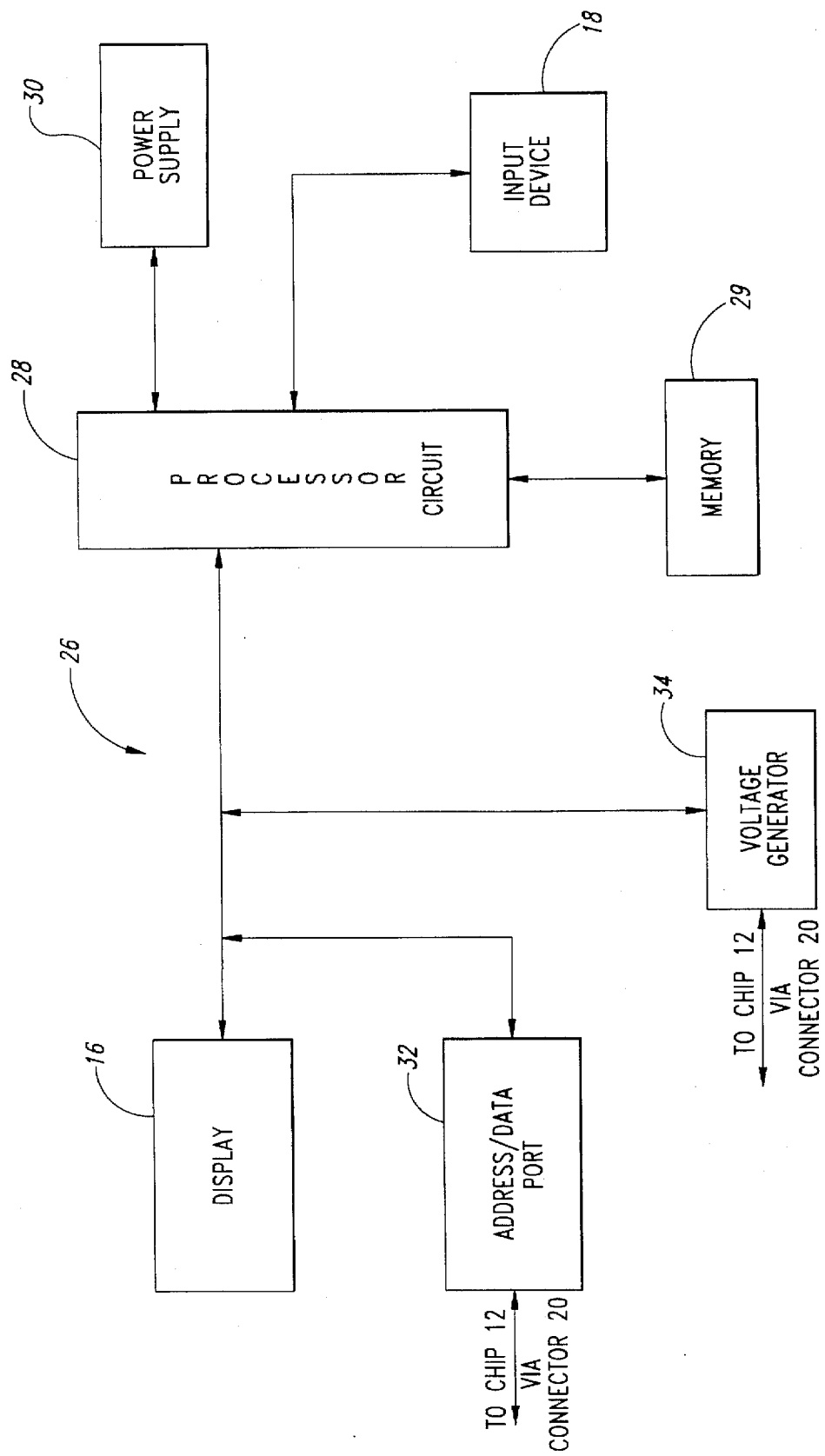
FIG. 2 is a block diagram of the circuitry of the device of FIG. 1.

FIG. 2 is a block diagram of one embodiment of processing circuitry 26 used in the device 10. The circuitry 26 includes a processor circuit 28 that controls other portions of the circuitry 26 as discussed below. A memory 29 stores programming, menu, and other data for the processor circuit 28. The processor circuit 28 executes the programming data, which instructs the processor circuit 28 as to how to manipulate the other data to generate the memory display and information. A power supply 30, which may be a battery, provides power to the processor circuit 28, the memory 29, and the remaining portions of the circuitry 26, and also to the IC 12 via the connector 20 (FIG. 1). The input device 18 allows the operator to provide instructions to the processor circuit 28, and the display 16 displays information that the processor circuit 28 generates and provides to the display 16. For example, in one embodiment of the invention, the processor circuit 28 receives the operator's menu selections from the input device 18, and provides the menu data and the selected identification information for the operator to view on the display 16. An address/data port 32 interfaces the processor circuit 28 to the IC 12 via the connector 20. An optional signal generator 34 provides a signal via the connector 20 that enables the IC 12 to allow the device 10 access to the identification information. That is, the enable signal acts as a combination or key that "unlocks" the identification information from the IC 12. Thus, such an enable signal may be used as a security measure to prevent unauthorized access to the identification information. Or, such an enable signal may be used merely to prevent a user from accidentally stumbling upon such identification information and thus from believing that the IC 12 is malfunctioning.

In operation, when the processing circuit 26 is powered up, the processor circuit 28 executes a start-up routine that is stored in the memory 29. During this start-up routine, the processor circuit 28 tests and initializes to a proper state the other components of the circuitry 26 in a conventional manner. Additionally, the processor circuit 28 may provide data to the display 16 that indicates to the operator that the start-up routine is in progress.

After the processor circuit 28 completes the start-up routine, it addresses the identification-information memory locations (not shown) on the IC 12, and reads and stores in the memory 29 the identification data stored at these locations. First, the processor circuit 28 determines whether or not the IC 12 is properly coupled to the connector 20. (Alternatively, the processor circuit 28 may make this determination during the start-up routine.) If the IC 12 is not so coupled, the processor circuit 28 provides a message so stating to the display 16, and waits for the operator to properly couple the IC 12 to the device 10. If the process circuit 28 finds that the IC 12 is properly connected to the device 10, the processor circuit 28 reads and stores the identification data. In one embodiment of the invention, before it begins reading the identification information, the processor circuit 28 instructs the generator 34 to provide the enable signal as described above.

After the processor circuit 28 reads and stores all of the identification data that is stored on the IC 12, it provides the selection menu for display on the display 16. As discussed above, the selection menu shows the operator the categories of identification information that are available, and prompts the operator to select with the input device 18 the category or categories he or she wishes to view. In an embodiment of the invention where the menu has multiple view screens, the operator uses the input device 18 to step through the menu until he or she gets to the screen he or she wishes to view. Of course, other techniques for displaying and selecting the identification information may be implemented without departing from the spirit and scope of the invention.

As discussed above, because the processor circuit 28 reads and stores the identification data before it displays this data on the display 16, the operator can decouple the IC 12 from the device 10 after the processor circuit 28 completes this reading and storing. Thus, the operator may begin and continue to view the identification data even after he or she has uncoupled the IC 12 from the device 10.

Figure 3A:
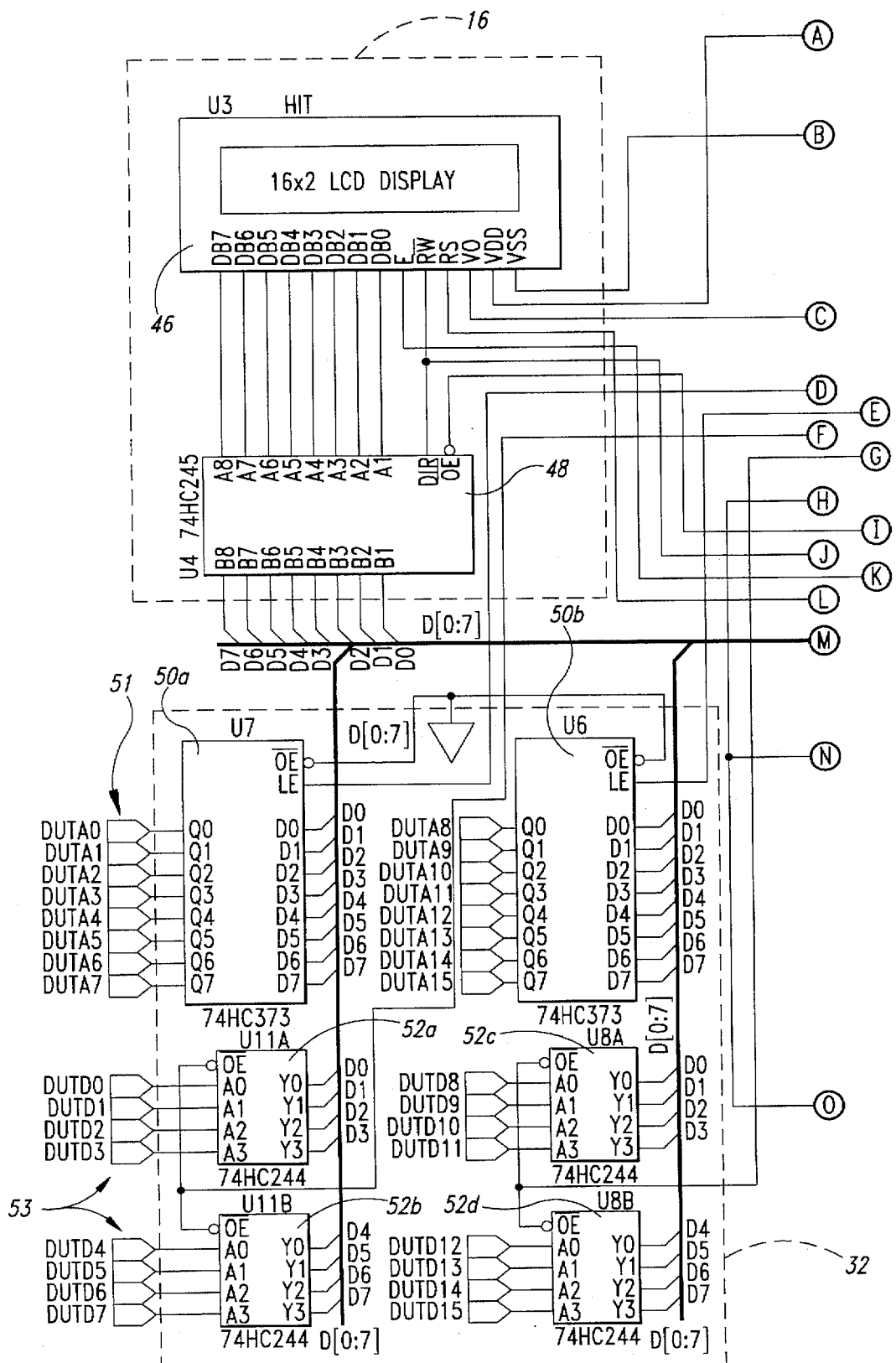
FIGS. 3A and 3B are schematic diagrams of the circuitry of FIG. 2.
Figure 3B:
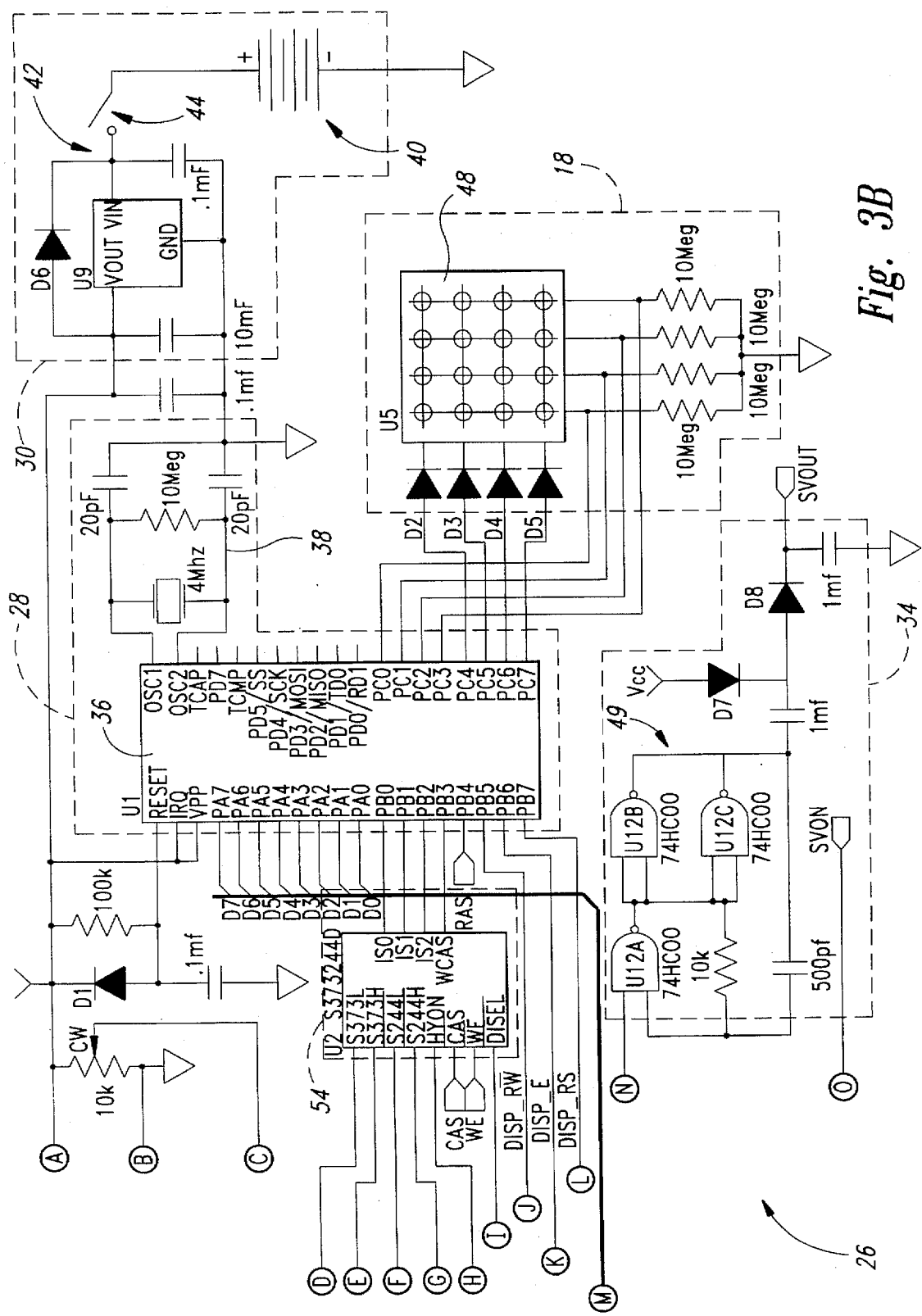

FIGS. 3A and 3B are schematic diagrams of one embodiment of the processing circuit 26 of FIG. 2. Nodes A–O show the interconnection points between the portions of the processing circuit 26 shown in FIG. 3A and the portions shown in FIG. 3B. As shown, the processor circuit 28 includes a processor 36 that has onboard storage memory and a conventional oscillator circuit 38 for generating a stable clock signal. In one embodiment of the invention, the processor 36 is a Motorola 68705 microprocessor, which is coupled as shown. Because the processor 36 has its own onboard storage memory, the memory 29 is part of the processor 36 rather than a separate component.

The power supply 30 includes a battery 40 and a regulator circuit 42, which generates a regulated supply voltage Vcc from the battery voltage. The power supply circuit 30 also includes an on/off switch 44, which is coupled between the battery 40 and the regulator circuit 42. Typically, the power supply 30 provides Vcc to the other components of the circuitry 26 as well as to the IC 12. In one embodiment of the invention, the regulator 42 is a National Semiconductor LM293 1, the battery voltage is 9 volts, and Vcc is 5 volts.

The display 16 includes an LCD display panel 46 and a decoder 48. In one embodiment of the invention, the display panel 46 is a Hitachi LM016L, and the decoder 48 is a 74HC245. The input device 18 includes a conventional keypad 47 that is coupled as shown.

The signal generator 34 includes a conventional voltage doubler circuit 49 that substantially doubles the supply voltage Vcc, and supplies this doubled voltage 2Vcc as the enable signal on the terminal SVOUT. This enable signal may be referred to as a "super voltage."

The address/data port 32 includes address latches 50 that are coupled between an address bus 51 and I/O ports PA 0–7 of the processor 36, and data buffers 52 that are coupled between a data bus 53 and the same I/O ports PA 0–7 of the processor 36 as shown. The address bus 51 and the data bus 53 are coupled to the IC 12 via the connector 20 (FIG. 1). In one embodiment of the invention, the address latches 50 are 74HC373 latches, and the data buffers 52 are 74HC244 unidirectional buffers.

The processor circuitry 26 also includes an interface 54, which interfaces control signals from the processor 36 to the voltage generator 34, the display 16, and the address/data port 32. In one embodiment of the invention, the interface 54 is a SAL16USZ programmable array logic (PAL) device.

Figure 4:
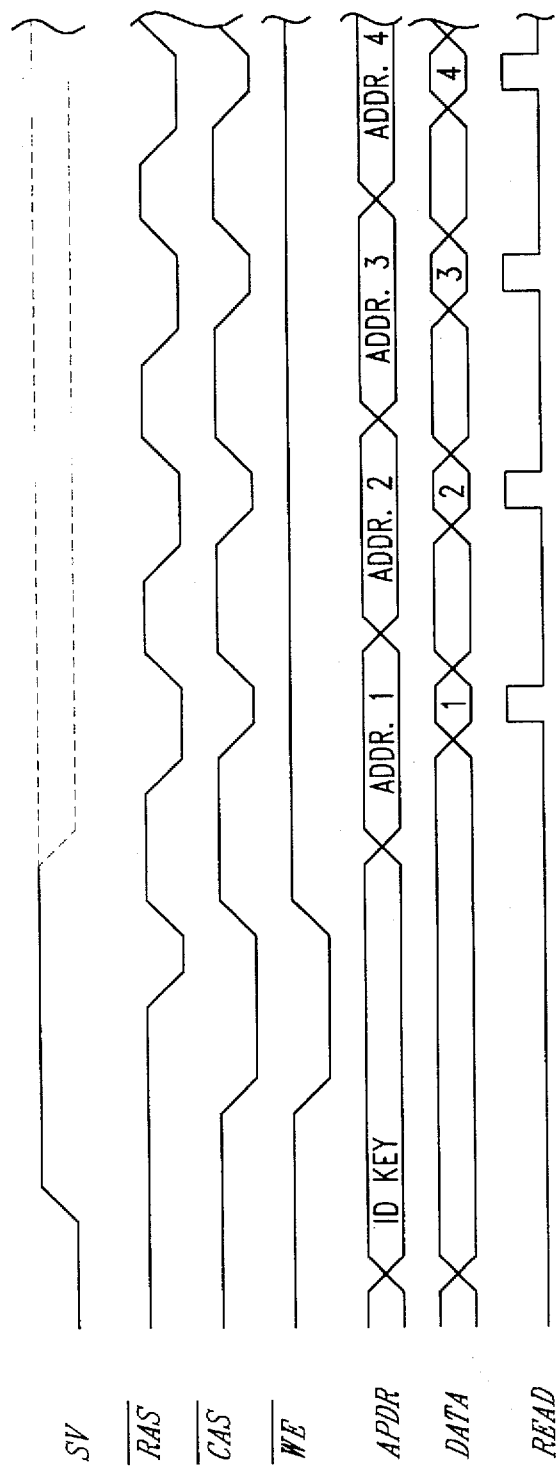
FIG. 4 is a timing chart of signals associated with the circuitry of FIGS. 3A and 3B during the reading of identification data from an IC.

FIG. 4 shows a relative timing diagram of signals that the processor 36 (FIG. 3B) generates and receives during the reading and storing of the identification information from the IC 12 (FIG. 1). To access the identification data, the processor 36 generates a sequence of signals not normally sent to the IC 12 during other modes of operation. In the discussed example, the IC 12 is a dynamic random access memory (DRAM), although it is understood that the processor 36 may implement the same technique to access identification information from other types of ICs.

More specifically, the processor 36 first instructs the voltage generator 34 to generate the super voltage (SV) for a predetermined lime that is sufficient to "unlock" the IC 12, and thus allow the device 10 (FIG. 1) access to the identification information stored thereon. The processor 36 also generates an identification code or key on the address bus 51. This code informs the IC 12 that the following read cycles will be of the memory locations (not shown) that store the identification information, and may also provide an additional security feature to prevent unauthorized access to the identification information. While the processor 36 drives this code onto the address bus 51, it also drives both the column address strobe ($\overline{CAS}$) and the write enable ($\overline{WE}$) to an active low logic level. At a predetermined time later, the processor 36 also drives the row address strobe ($\overline{RAS}$) to an active low logic level. Because in its other modes of operation the IC 12 sees $\overline{RAS}$ transition logic low only before $\overline{CAS}$ transitions logic low, not after, this particular sequence of $\overline{RAS}$ and $\overline{CAS}$ is suitable to initiate a read of the identification data. One type of IC 12 that can be unlocked with the described technique is a MT4LC4M4B1BW 16-megabit DRAM, which was manufactured by Micron Semiconductor, Inc. of Boise, Id.

After it instructs the IC 12 to allow the reading of its identification information, the processor 36 begins accessing and storing this information. First, the processor 36 chives $\overline{RAS}$, $\overline{CAS}$, and $\overline{WE}$ to inactive logic high levels. Next, the processor drives an address, here ADDRESS 1, onto the address bus 51, drives $\overline{RAS}$ to a low logic level, and then drives $\overline{CAS}$ to a low logic level. While $\overline{CAS}$ is at a low logic level, the IC 12 places onto the data bus 53 the identification information stored in the addressed location. While the information is present on the data bus 53, the processor 36 pulses an internal signal READ to latch the information into the internal memory of the processor 36. This read sequence continues until the processor 36 reads all of the identification data from the IC 12. The circuitry 26 then displays on the display 16 selected portions of the identification information as discussed above.

Figure 5:
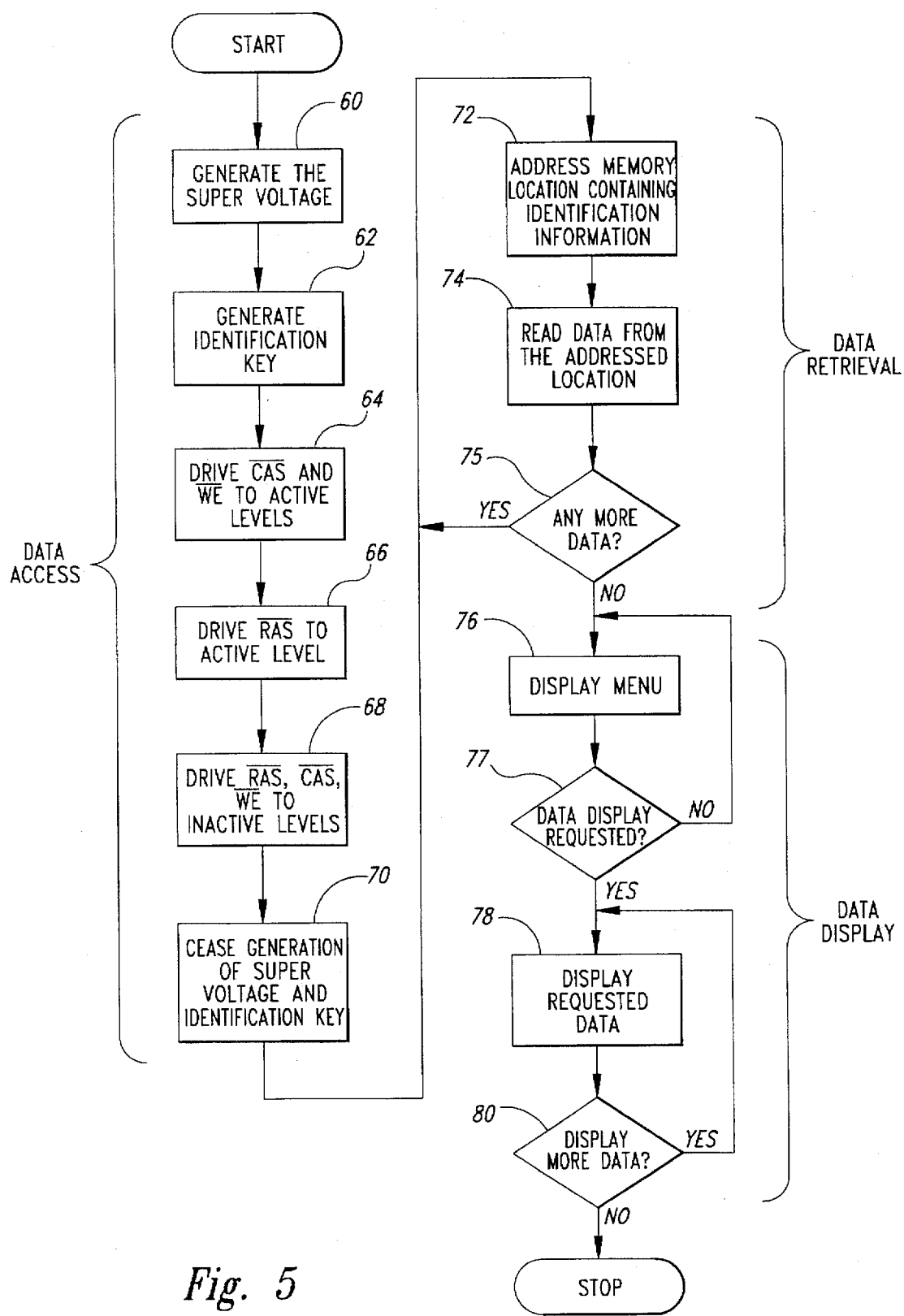
FIG. 5 is a flow chart of the operation of the circuit of FIGS. 3A and 3B.

FIG. 5 is a flow chart detailing the operation as discussed above for the processing circuit 26 of FIGS. 3A and 3B. Blocks 60–70 illustrate the steps required to access the identification data on the IC 12. First, the processor 36 generates the supervoltage as shown in the block 60. Next, while it is generating the supervoltage, the processor 36 generates the identification key on the address bus 51 as shown in the block 62. Next, while it is generating the supervoltage and the identification key, the processor 36 drives the signals $\overline{CAS}$ and $\overline{WE}$ to active logic levels as shown in the block 64. Next, while the processor 36 is generating the supervoltage, the identification key and driving $\overline{CAS}$ and $\overline{WE}$ to active levels, the processor 36 drives $\overline{RAS}$ to an active level as shown in the block 66. Next, as shown in the block 68, the processor 36 drives $\overline{RAS}$, $\overline{CAS}$ and $\overline{WE}$ to inactive levels. As shown in the block 70, the processor circuit 36 then ceases generation of the supervoltage and the identification key.

Blocks 72–75 describe the data retrieval steps. As shown in the block 72, the processor 36 addresses a memory location containing the identification information or data. Next, as shown in the block 74, the processor circuit 36 reads the data from the addressed location. As shown in the decision block 75, if there is any more data to be read, the processor circuit 36 then goes back to the block 72 and begins addressing the next memory location. If all the data has been read, the processor circuit 36 enters the data display portion of the routine.

The blocks 76–80 describe the data display portion of the routine. As shown in the block 76, the processor circuit 36 instructs the display 16 to display the menu. Next, as shown in the decision block 77, if the operator does not request that any specific data be displayed, the processor circuit 36 continues to generate and the display device 16 continues to display the menu. If the operator does select information for display, the processor circuit 36 provides this information for display on the device 16 as shown in the block 78. Next, as shown in the block 80, if the operator requests the display of more data, then the processor circuit 36 provides this data for display on the device 16. When the operator has completed viewing the data, the routine ends.

From the foregoing, it will be appreciated that, although specific embodiments of the invention have been described herein for purposes of illustration, various modifications may be made without deviating from the spirit and scope of the invention. For example, the device 10 and the IC 12 may include wireless receiver/transmitters so that physical coupling between the IC 12 and the device 10 is not required. Accordingly, the invention is not limited except as by the appended claims.

We claim:

1. A device for reading identification data stored in an integrated circuit, the device comprising:
   a portable enclosure including a first wall having a first opening and including a second wall having a second opening;
   a first connector mounted within said first opening and having a first side that can couple with said integrated circuit and also having a second side;
   a processor mounted within said enclosure and having a data terminal coupled to said second side of said connector and having a display terminal, said processor operated under software control to retrieve said identification data from said integrated circuit; and
   a display mounted within said second opening and having an input terminal coupled to said display terminal of said processor, said display operated to receive said identification data from said processor and to display said identification data.

2. The device of claim 1, further comprising:
   said processor having an input terminal;
   said portable enclosure having a third wall having a third opening; and
   an input device mounted within said third opening and having an output terminal coupled to said input terminal of said processor, said input device operated to provide instructions to said processor.

3. The device of claim 2 wherein said input device comprises a key pad.

4. The device of claim 2 wherein said second wall and said third wall are the same wall.

5. The device of claim 1 wherein said portable enclosure comprises a hand-holdable enclosure.

6. The device of claim 1 wherein said processor has an output terminal and wherein said device further includes an enable-signal generator mounted within said enclosure and having an input terminal coupled to said output terminal of said processor and having an output terminal coupled to said second side of said connector.

7. The device of claim 1 wherein said processor has a memory terminal and wherein said device further includes a memory having a processor terminal coupled to said memory terminal of said processor, said memory having stored therein software instructions that said processor executes to generate a data-selection menu on said display and to provide to said display an operator-selected portion of said identification data.

8. The device of claim 1, further comprising an adapter having a second connector that can mate with said first side of said first connector and having a third connector that can mate with said integrated circuit and that is coupled to said second connector.

9. A device for reading identification data stored in an integrated circuit that is disposed within an integrated circuit package, the device comprising:

a hand-holdable enclosure;

a first connector mounted to the enclosure and having a first side that can be coupled to the integrated circuit package, the first connector also having a second side;

a processor mounted to the enclosure and having a data terminal coupled to the second side of the connector and having a display terminal, the processor operated under software control to retrieve the identification data from the integrated circuit; and a display mounted to the enclosure and having an input terminal coupled to the display terminal of the processor, the display operated to receive the identification data from the processor and to display the identification data.

10. The device of claim 9, further comprising an adapter having a second connector that can mate with the first side of the first connector and having a third connector that can mate with the integrated circuit package, the third connector coupled to the second connector.

11. The device of claim 9, further comprising:

the processor having an input terminal and a memory terminal;

an input device mounted to the enclosure and having an output terminal coupled to the input terminal of the processor, the input device operated to provide an operator instruction to the processor;

a memory having a processor terminal coupled to the memory terminal of the processor, the memory having stored therein software instructions;

the processor operated to execute the software instructions to generate a data-selection menu, to provide the menu to the display, and to provide to the display a portion of the identification data that is selected in response to the operator instruction; and the display operated to display the data-selection menu and the selected portion of the identification data.

12. A device for reading identification data stored in an integrated circuit, the device comprising:

a hand-holdable enclosure;

a first connector attached to said enclosure and having first and second sides;

a processor disposed within said enclosure and having a display terminal and having a data terminal that is electrically coupled to said second side of said first connector, said processor operated under software control to retrieve said identification data from said integrated circuit;

a display attached to said enclosure and having an input terminal that is electrically coupled to said display terminal of said processor, said display operated to receive said identification data from said processor and to display said identification data; and an adapter having second and third connectors, said second connector having a first side that can mate with said first side of said first connector and having a second side, said third connector having a first side that is electrically coupled to said second side of said second connector and having a second side that can couple to said integrated circuit.

13. The device of claim 12, further comprising:

said processor having an input terminal and a memory terminal;

an input device attached to said enclosure and having an output terminal coupled to said input terminal of said processor, said input device operated to provide operator instructions to said processor;

a memory having a processor terminal coupled to said memory terminal of said processor, said memory having stored therein software instructions;

said processor operated to execute said software instructions to generate a data-selection menu, to provide said menu to said display, and to provide to said display a portion of said identification data that is selected from said data-selection menu via said input device; and said display operated to display said data-selection menu and said selected portion of said identification data.

* * * * *